United States Patent Office 3,054,707
Patented Sept. 18, 1962

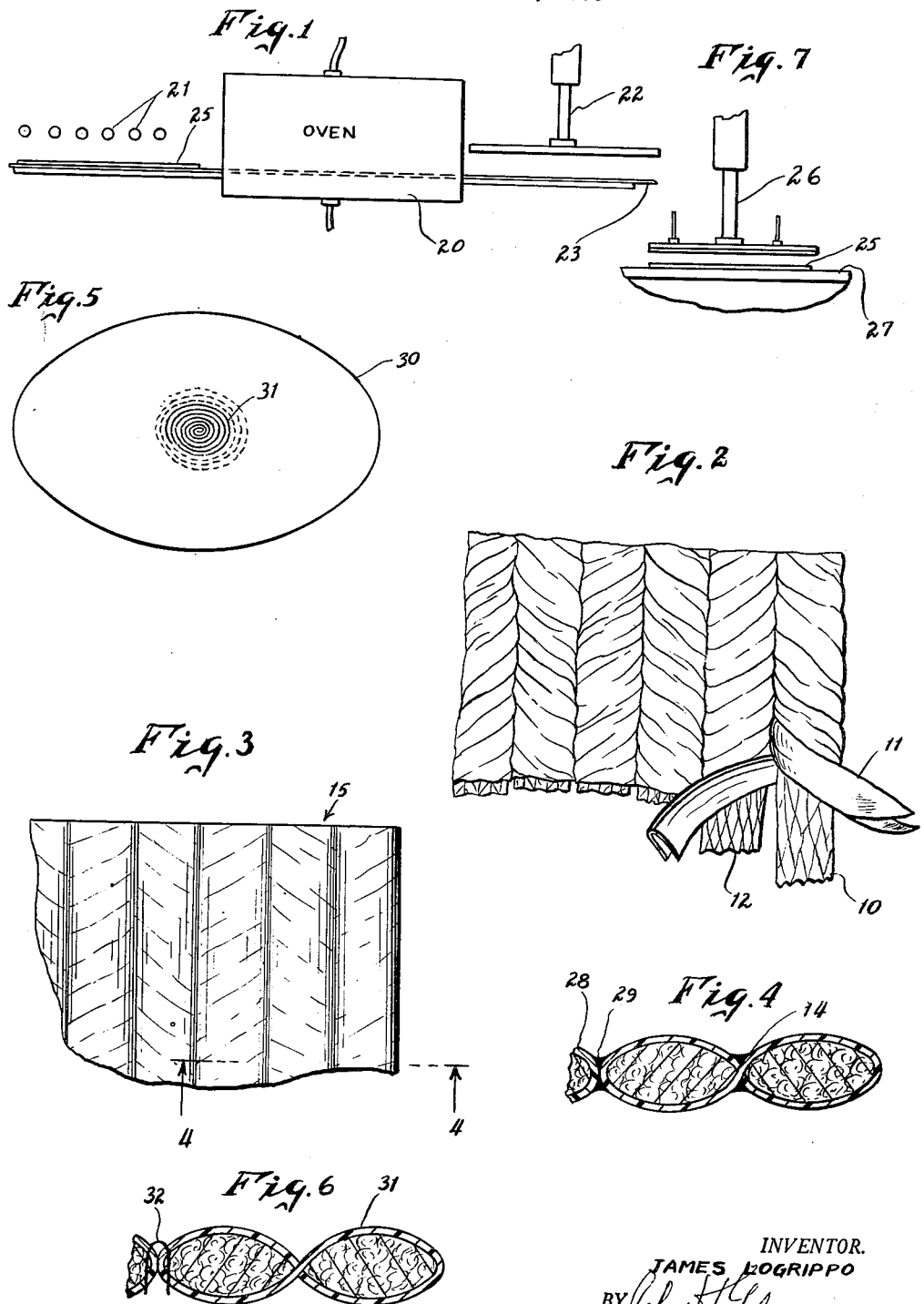

3,054,707
THERMOPLASTIC RUG AND METHOD OF MAKING SAME
James Logrippo, Norristown, Pa., assignor to Norristown Rug Mfg. Co., Norristown, Pa., a corporation of Pennsylvania
Filed Nov. 26, 1956, Ser. No. 624,461
4 Claims. (Cl. 154—49)

This invention relates to the sealing of thermoplastic materials and an end product which may be put to many and varied types of uses. For the purpose of describing the product this specification will refer to a rug. However, it may be used in many forms, such as insulation, wall coverings, seat covers, etc.

An object of the invention is to provide an article as hereinafter described which will be durable, reasonable in price, and attractive in appearance.

In the past it has been customary to make rugs of braided material such as vinyl plastics with a core of cotton or similar material. These rugs have generally been oval in shape and have been made by winding the braid upon itself and sewing each row of braid to the next. Rugs so made are attractive and durable, but once the stitching goes the rug deteriorates and quickly unravels.

One object of this invention is to provide an article of the type described, such as a rug, which will be integral in its nature and which will not depend upon stitching to hold it together.

A further object is to provide a rug which can be economically made and which will be far more durable than those previously made.

A still further object is to provide a rug which will be waterproof and which may be easily cleaned.

Other objects and advantages of the invention will appear from the following specification and the accompanying drawings.

In the drawing—

FIG. 1 is a schematic view of a method of making my material.

FIG. 2 is a view of the manner in which the rug is formed.

FIG. 3 is a fragmentary view of a rug formed with the method described herein.

FIG. 4 is a cross-sectional view taken on the line 4—4 of FIG. 3.

FIG. 5 is a view of an oval type of rug.

FIG. 6 is a cross sectional view of a section of the rug shown in FIG. 5.

FIG. 7 is a schematic view of the press using an alternate form of my invention.

Referring more particularly to the drawings, and specifically to FIG. 2, the braid is formed, normally consisting of two strands. As shown in FIG. 2, there is a core 10 of cotton or similar material which is covered by a braid 11 of plastic such as vinyl plastic. Normally, two cores 10 and 12 are braided together to form a strand 14, such as is shown in FIG. 4. These strands are normally stitched together to form an oval rug, such as shown in FIG. 5. However, when the stitching breaks they separate and the rug is destroyed.

In my present invention I take a series of strands 14 to form the finished rug 15 and pass them through a high frequency oven 20. In order to accelerate the process, the strands, having been placed together, are preheated by infra-red lamps 21. They are then passed into the high frequency oven 20, which will soften the plastic and cause the various strands to adhere to a certain extent. As they pass out of the oven 20 they are subjected to momentary pressure by a press 22 which not only seals the strands together to form a finished integral unit, but also seals the individual braids 11 to each other so as to prevent any moisture from reaching the cotton core 10. The press 22 is preferably a cold press and may be provided with water jackets to cool it in order to set the plastic so that it may be readily handled by the processing machinery.

In order to prevent glazing and possible adherence to the base of the oven, a conveyor 23 made of non-sticking material such as fiber glass, asbestos or Teflon may be used to carry the rug through the material 25 through the oven and under the press. This not only prevents glazing and sticking, but also prevents undue tension on the braids and strands as they pass through the oven.

While in my improved form I show a high frequency oven 20 and a cold press 22, a similar effect may be secured by means of a high frequency press, such as is shown in FIG. 7, in which the various strands forming the rug 25 are fused in the press 26 as the material is fed intermittently across the press table 27. In either case the various strands are fused together by their edges, and the braided material is likewise fused to form a waterproof seal. This is clearly shown in FIG. 4 where the strand 14 is fused to the strand 28 at 29. If desired, of course, the press 22 and the press 26 may be embossed to provide the finished rug with a design, but an attractive design is secured by using plastic covering of different designs and weaving the designs into the strands.

Where it is desired to form an oval rug, such as is shown in FIG. 5, the rug 30 may be formed in the usual way with the strands 31 coiled upon each other and stitched by means of the stitching 32, as shown in FIG. 6. The rug is then subjected to the high frequency, either of the oven or of a high frequency press, which causes the strands to expand under the heat against the stitches and to fuse the strands together as heretofore described. While I have shown a reciprocating press, any type of pressing bars or plates could be used, or a continuous link belt press.

Throughout the specification I have referred to the use of heat, but it will be understood that this term is not to be defined as heat in the normal sense, but is to be defined as the heat developed within the product when it is subjected to a high frequency electronic field which sets up a molecular reaction within the thermoplastic material to cause it to form an integral mass as distinguished from a series of strands or elements glued together or fastened by adhesive. As has been pointed out, not only are the braided strands themselves integrally fused to each other, but the individual strips of braid are likewise fused to each other to form an integral mass and to present a waterproof surface.

I claim:

1. A rug comprising a plurality of strands, each of said strands consisting of one or more cores of relatively resilient material having a covering of braided thermoplastic material, said strands being fused together and said braided thermoplastic material being fused into an integral mass.

2. A rug comprising a plurality of strands, each of said strands having a core of relatively resilient material and a covering of braided thermoplastic material, said strands being fused together and the covering of said braids being fused to the next braid.

3. A rug comprising a plurality of strands, each of said strands consisting of one or more cores of relatively resilient material having a covering of braided thermoplastic material, each of said strands being electronically fused to another strand and said braided thermoplastic material being molecularly fused into an integral mass.

4. A method of forming a rug, which comprises forming strands having a relatively resilient core and a braided thermoplastic covering, placing a plurality of said strands in juxtaposition in the shape of the finished article, subjecting said article to a high frequency electronic field to molecularly fuse said strands to each other and to fuse the individual braids to the adjacent braids.

References Cited in the file of this patent

UNITED STATES PATENTS

| | | |
|---|---|---|
| 1,519,522 | Weigel | Dec. 16, 1924 |
| 1,550,636 | Robinson | Aug. 18, 1925 |
| 1,746,948 | King | Feb. 11, 1930 |
| 2,435,467 | Spencer | Feb. 3, 1948 |
| 2,457,659 | Graham et al. | Dec. 28, 1948 |
| 2,514,197 | Groten et al. | July 4, 1950 |
| 2,749,261 | Hardison | June 5, 1956 |
| 2,757,110 | Kalbach | July 31, 1956 |